(12) United States Patent
Min et al.

(10) Patent No.: US 8,876,150 B2
(45) Date of Patent: Nov. 4, 2014

(54) ANTI-TWIST DEVICE FOR A VEHICLE AIRBAG

(75) Inventors: Byung-Ho Min, Seoul (KR); Soon-Bok Lee, Yongin-si (KR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/882,862

(22) PCT Filed: Oct. 27, 2011

(86) PCT No.: PCT/KR2011/008063
§ 371 (c)(1),
(2), (4) Date: May 2, 2013

(87) PCT Pub. No.: WO2012/060573
PCT Pub. Date: May 10, 2012

(65) Prior Publication Data
US 2013/0214516 A1    Aug. 22, 2013

(30) Foreign Application Priority Data
Nov. 2, 2010 (KR) ........................ 10-2010-0108185

(51) Int. Cl.
*B60R 21/232* (2011.01)
*B60R 21/213* (2011.01)

(52) U.S. Cl.
CPC ............. *B60R 21/213* (2013.01); *B60R 21/232* (2013.01)
USPC ..................................... 280/728.2; 280/730.2

(58) Field of Classification Search
CPC .... B60R 21/213; B60R 21/232; B60R 21/201
USPC ........................................... 280/728.2, 730.2
See application file for complete search history.

(56) References Cited

U.S. PATENT DOCUMENTS 6,827,368 B2    12/2004  Jang et al.
7,125,038 B2 *  10/2006  Gammill .................... 280/728.2
(Continued)

FOREIGN PATENT DOCUMENTS

KR    10-0787671 B1    12/2007
KR    10-0857135 B1     9/2008

OTHER PUBLICATIONS

International Search Report for PCT/KR2011/008063, ISA/KR, Daejeon, mailed Jun. 4, 2012.

*Primary Examiner* — Drew Brown
(74) *Attorney, Agent, or Firm* — Harness Dickey & Pierce, P.L.C.

(57) ABSTRACT

Disclosed is an anti-twist device for a curtain airbag of a vehicle. The anti-twist device allows a worker to immediately recognize the twist of the curtain airbag or automatically releases the twist of the curtain airbag when the curtain airbag is installed in the vehicle, thereby improving stability of the curtain airbag. The anti-twist device is mounted on the curtain airbag including a bracket having an inflator mounted thereon and coupled to a vehicle body, the airbag cushion received in a winding state while communicating with the inflator, and a band surrounding the airbag cushion, and includes a body having a predetermined length and provided in parallel to the airbag cushion, a first fixing part formed at one end of the body and coupled with the bracket or the vehicle body, and a second fixing part formed at an opposite end of the body and coupled with the band.

11 Claims, 8 Drawing Sheets

(56) References Cited

U.S. PATENT DOCUMENTS

| | | | |
|---|---|---|---|
| 7,677,595 B2 * | 3/2010 | Dominissini et al. | 280/728.2 |
| 7,748,734 B2 * | 7/2010 | Wilmot | 280/730.2 |
| 7,950,694 B2 | 5/2011 | Kim et al. | |
| 8,083,255 B2 * | 12/2011 | Okimoto et al. | 280/730.2 |
| 8,157,290 B2 * | 4/2012 | Kjell et al. | 280/730.2 |
| 2003/0006587 A1 | 1/2003 | Jang et al. | |
| 2004/0201207 A1 * | 10/2004 | Ochiai et al. | 280/730.2 |
| 2005/0057023 A1 * | 3/2005 | Burton et al. | 280/730.2 |
| 2005/0206135 A1 * | 9/2005 | Nelson et al. | 280/728.2 |
| 2009/0295137 A1 | 12/2009 | Kim et al. | |
| 2013/0087999 A1 * | 4/2013 | Konishi et al. | 280/743.1 |
| 2013/0113192 A1 * | 5/2013 | Richards et al. | 280/730.2 |

* cited by examiner

ANTI-TWIST DEVICE FOR A VEHICLE AIRBAG

CROSS-REFERENCE TO RELATED APPLICATIONS

This application is a 371 U.S. National Stage of International Application No. PCT/KR2011/008063, filed Oct. 27, 2011. This application claims priority to Korean Patent Application No. 10-2010-0108185, filed Nov. 2, 2010. The disclosures of the above applications are incorporated herein by reference.

TECHNICAL FIELD

The present invention relates to an anti-twist device for a curtain airbag of a vehicle. More particularly, the present invention relates to an anti-twist device for a curtain airbag of a vehicle, capable of allowing a worker to immediately recognize the twist of the curtain airbag or automatically releasing the twist of the curtain airbag when the curtain airbag is installed in the vehicle, thereby improving stability of the curtain airbag.

BACKGROUND ART

In general, an airbag is a safety device protecting drivers and passengers from vehicle collision.

The airbag is classified into a driver airbag (DAB) and a passenger airbag (PAB) installed in a steering wheel and an instrumental penal, respectively, to protect the driver and passengers from colliding with the internal structures of a vehicle upon vehicle collision.

Recently, a curtain airbag (CAB) is additionally installed in a side portion of a vehicle to enhance the safety of a worker upon side collision of the vehicle.

Hereinafter, the CAB will be described with reference to FIGS. 1 and 2.

FIG. 1 is a schematic side view showing the installing state of the CAB of the vehicle according to the related art, and FIG. 2 is an exploded perspective view showing the CAB according to the related art.

As shown in FIGS. 1 and 2, the CAB of a vehicle according to the related art includes an airbag 10' fixedly mounted along pillars 2' of a vehicle body, an inflator 20' mounted on the pillars 2' to eject high pressure gas when side collision is detected, and a diffuser 30' inserted into the vehicle body in a longitudinal direction to guide the high pressure gas supplied from the inflator 20'.

The pillars 2' include a front pillar 4', a center pillar 6', and a rear pillar 8' classified according to their positions in the vehicle body in the transverse direction. The inflator 20' is mounted on the center pillar 6' or the rear pillar 8.

The airbag 10' includes an airbag cover 12' installed along the front pillar 4', the center pillar 6', and the rear pillar 8' in the transverse direction, and an airbag cushion 14' received in the airbag cover 12' in such a manner that the airbag cushion 14' is deployed downward.

The airbag cover 12' includes non-woven fabric and is provided at one side thereof with a cut line.

The airbag cushion 14' has to be wound and received inside the airbag cover 12'. However, the airbag cushion 14' may be twisted in the middle of providing the airbag cushion 14' in the airbag cover 12' or fixing the airbag cushion 14' to the vehicle.

If the airbag cushion 14' is received in a state in which the airbag cushion 14' is twisted as described above, the airbag cushion 14' may be abnormally deployed. Accordingly, the safety may be degraded.

DISCLOSURE OF INVENTION

Technical Problem

The present invention has been made to solve the problems occurring in the related art, and an object of the present invention is to provide an anti-twist device for a curtain airbag of a vehicle, in which the twist of an airbag cushion can be recognized visually and immediately when the airbag cushion is received in a state in which the airbag cushion is twisted, so that the twist of the airbag cushion can be corrected.

Another object of the present invention is to provide an anti-twist device for a curtain airbag of a vehicle, capable of allowing an airbag cushion that has been twisted to return into a normal state due to elastic recovery of the airbag cushion when the airbag cushion is twisted.

Solution to Problem

In order to accomplish the above objects of the present invention, there is provided an anti-twist device for a curtain airbag of a vehicle. The anti-twist device is mounted on the curtain airbag including a bracket having an inflator mounted thereon and coupled to a vehicle body, the airbag cushion received in a winding state while communicating with the inflator, and a band surrounding the airbag cushion, and includes a body having a predetermined length and provided in parallel to the airbag cushion, a first fixing part formed at one end of the body and coupled with the bracket or the vehicle body, and a second fixing part formed at an opposite end of the body and coupled with the band.

The body includes fabric and has a color different from that of the airbag cushion so that a worker can recognize the twist of the airbag cushion.

The body includes fabric and is formed on an outer surface thereof with a marked line having a color different from the airbag cushion, so that a worker can recognize the twist of the airbag cushion by the deformation of the marked line.

In another aspect, there is provided an anti-twist device for a curtain airbag of a vehicle. The anti-twist device is mounted on the curtain airbag including a bracket having an inflator mounted thereon and coupled to a vehicle body, the airbag cushion received in a winding state while communicating with the inflator, and a band surrounding the airbag cushion, and includes a body having a predetermined length and provided in parallel to the airbag cushion, a first fixing part formed at one end of the body and coupled with the bracket or the vehicle body, and a second fixing part formed at an opposite end of the body and coupled with the band. The body has a plate shape and includes plastic with elasticity, so that the airbag cushion can be released by the elasticity when the airbag cushion is twisted.

The first fixing part may have a threaded hole coupled with a screw, or may have an elongated circular hole, into which a protrusion of the bracket is inserted, with a predetermined length.

Advantageous Effects of Invention

According to the present invention, when the airbag cushion is received in a state in which the airbag cushion is twisted, the twist of the airbag cushion can be visually recognized, immediately, so that the worker can correct the twist of the airbag cushion. Accordingly, the defective rate of the airbag cushion can be reduced.

When the airbag cushion is twisted, an airbag cushion that has been twisted can return into a normal state due to elasticity of the anti-twist device. Accordingly, the failure of the airbag cushion can be prevented.

MODE FOR THE INVENTION

Hereinafter, exemplary embodiments of the present invention will be described in detail with reference to accompanying drawings.

Embodiment 1

Figure 1:
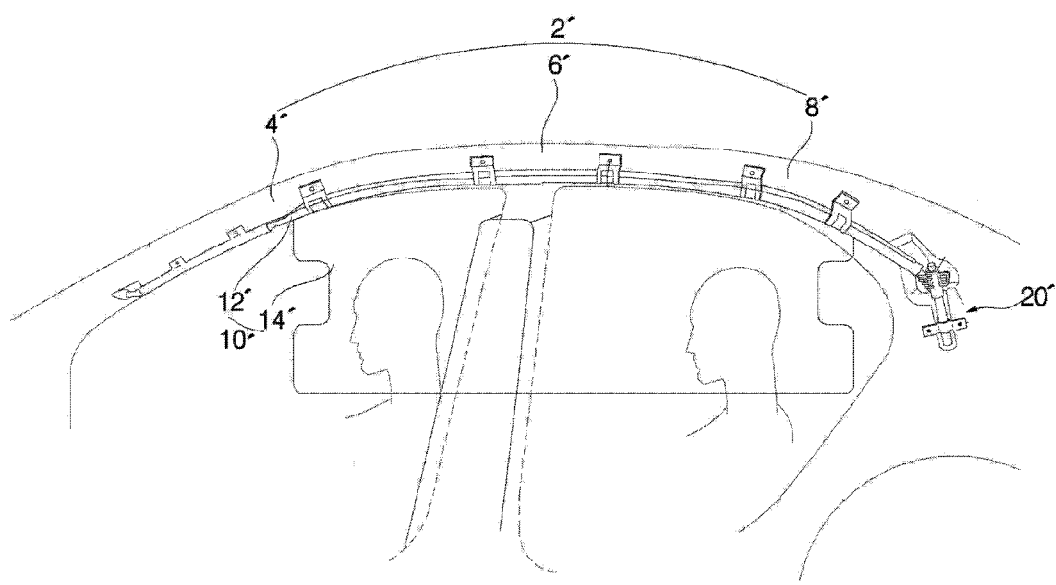
FIG. 1 is a schematic side view showing the installing state of a curtain airbag module of a vehicle according to the related art.
Figure 2:
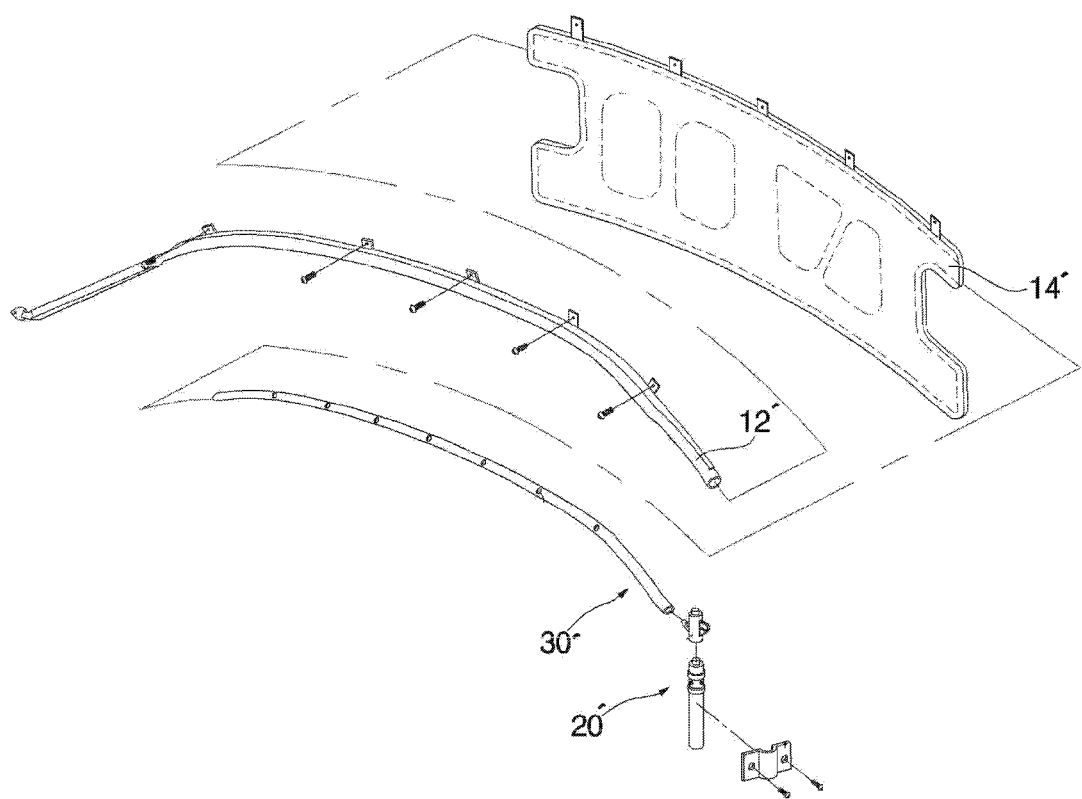
FIG. 2 is an exploded perspective view showing the CAB module according to the related art.
Figure 3:
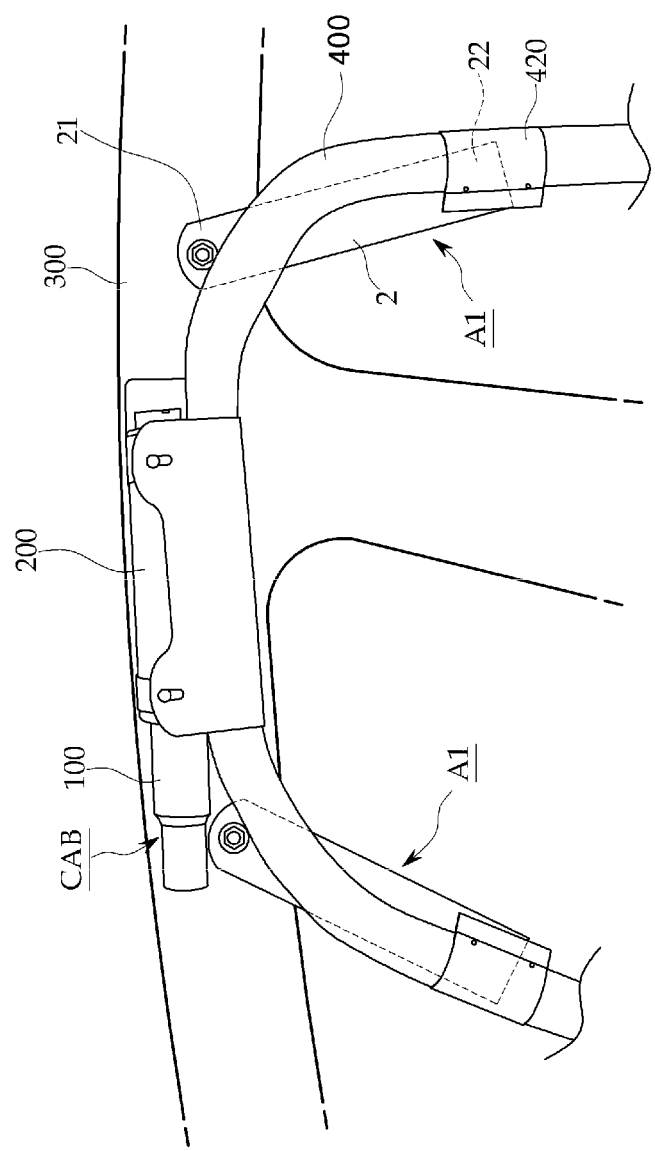
FIG. 3 is a view showing the mounting state of an anti-twist device for a curtain airbag of a vehicle according to the first embodiment of the present invention.
Figure 4:
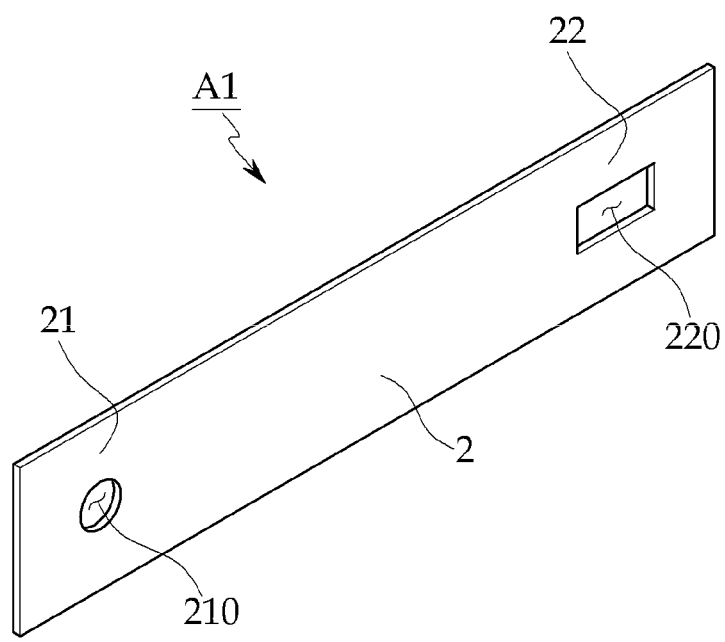
FIG. 4 is a perspective view showing the anti-twist device for the curtain airbag of the vehicle according to a first embodiment of the present invention.
Figure 5:
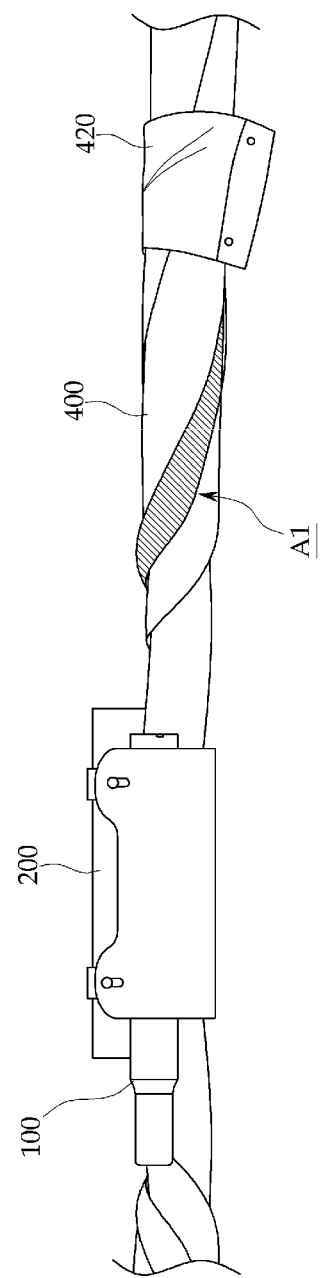
FIG. 5 is a view showing the exposure of the twist of the curtain airbag is twisted by the anti-twist device for the curtain airbag of the vehicle according to the first embodiment of the present invention.

FIG. 3 is a view showing the mounting state of an anti-twist device for a curtain airbag of a vehicle according to a first embodiment of the present invention, and FIG. 4 is a perspective view showing the anti-twist device for the curtain airbag of the vehicle according to the first embodiment of the present invention. FIG. 5 is a view showing the exposure of the curtain airbag by the anti-twist device for the curtain airbag of the vehicle according to the first embodiment of the present invention.

As shown in FIG. 3, a curtain airbag (CAB) module for a vehicle includes an inflator 100 mounted on a bracket 200 coupled with a pillar 300, an airbag cushion 400, which is received in a winding state and communicates with the inflator, and a band 420 of surrounding the airbag cushion 400 that has been received.

The airbag cushion 400 is wound in the form of the roll and received, and the band 420 surrounds an outer surface of the airbag cushion 400 such that the airbag cushion 400 is maintained in the winding state.

An airbag cover into which the airbag cushion 400 is inserted may be provided instead of the band 420. According to the first embodiment of the present invention, since an anti-twist device A1 has to be exposed to the outside, the anti-twist device A1 cannot be applied to the structure including the airbag cover (not shown).

As shown in FIG. 4, the anti-twist device A1 of the CAB for the vehicle according to the first embodiment of the present invention includes a body 2 having a predetermined length and provided in parallel to the airbag cushion 400. The body 2 is provided at one end thereof with a first fixing part 21 coupled with the bracket 200 or the pillar 300, and provided at an opposite end thereof with a second fixing part 22 coupled with the band 420.

Preferably, the body 2 includes fabric or plastic fabricated in a rectangular shape having a predetermined area.

The body 2 may have a color different from that of the airbag cushion 400 such that the body 2 can be easily distinguished from the airbag cushion 400. In general, since the airbag cushion 400 has a white-based color, the body 2 may have a gray color or other colors.

Therefore, the body 2 has a color different from that the airbag cushion 400 as described above, so that a worker can easily recognize the twist of the airbag cushion 400 through a naked eye because the body 2 of the anti-twist device A1 is also twisted together with the airbag cushion 400.

Meanwhile, according to another embodiment, the body 2 may be provided on an outer surface thereof with a marked line having a color different from that of the airbag cushion 400.

The marked line has the form of a straight line parallel to the body 2 in the longitudinal direction.

Accordingly, when the body 2 is twisted, the marked line is twisted, so that the twist state of the airbag cushion 400 can be detected to the naked eye of a worker.

The first fixing part 21 of the body 2 is provided therein with a threaded hole 210 coupled with a screw, and the second fixing part 22 is provided therein with a clip hole 220 coupled with the clip (not shown).

The clip hole 220 is coupled with a clip. Accordingly, the clip hole 220 has a rectangular shape as shown in FIG. 4.

Since the second fixing part 22 has to be fixed to the band 420 having a soft characteristic like fabric, the clip (not shown) is used as a fixing unit instead of a screw (not shown). Accordingly, the clip hole 22 applicable to the clip is formed.

Hereinafter, the mounting of the anti-twist device A1 according to the first embodiment will be described.

As shown in FIG. 3, the first fixing part 21 is fixedly coupled with the pillar 300 by using a screw, and the second fixing part 22 is fixed to the band 420 by using a clip.

Therefore, when the airbag cushion 400 is normally installed, the body 2 of the anti-twist device A1 is maintained in a flat state. Accordingly, the worker can recognize that the airbag cushion 400 is normally installed through the naked eye.

However, as shown in FIG. 5, when the airbag cushion 400 is twisted, the anti-twist device A1 is also twisted with the airbag cushion 400. In particular, when the anti-twist device A1 has a color different from that the airbag cushion 400, or has a marked line, the worker can more definitely recognize the failure state.

Embodiment 2

Figure 6:
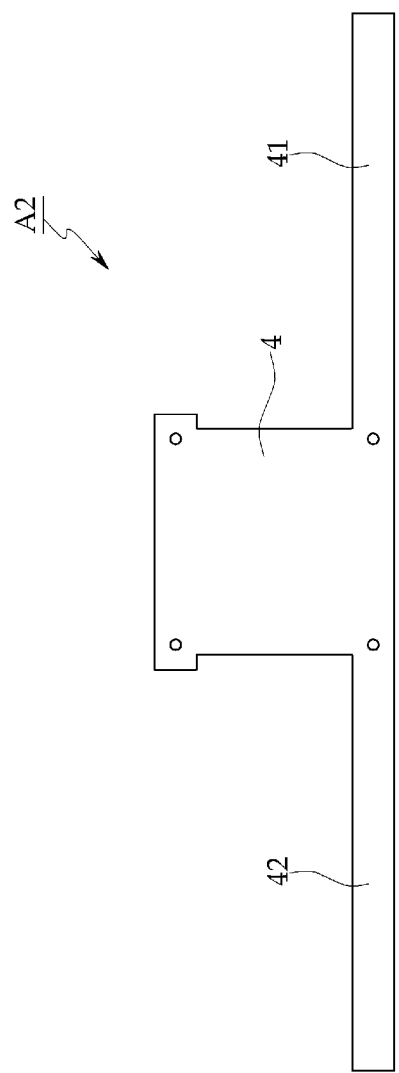
FIG. 6 is a front view showing an anti-twist device for a curtain airbag of a vehicle according to a second embodiment of the present invention.
Figure 7:
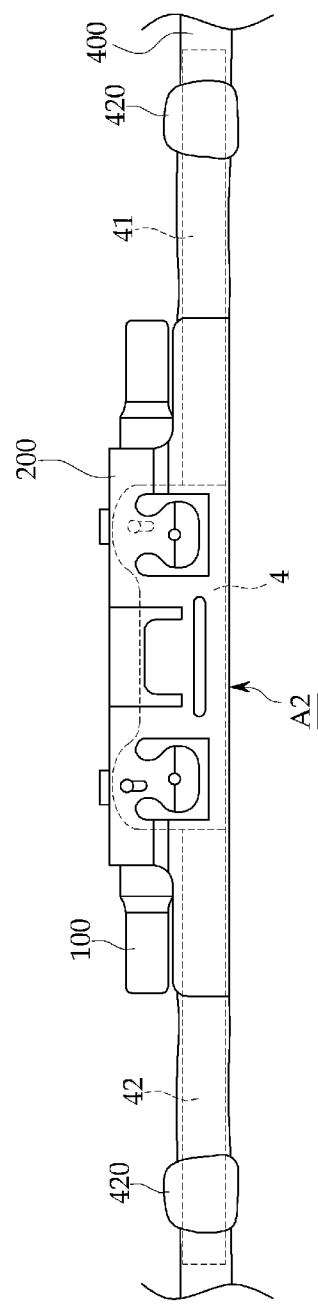
FIG. 7 is a view showing the mounting state of the anti-twist device for the curtain airbag of the vehicle according to the second embodiment of the present invention.
Figure 8:
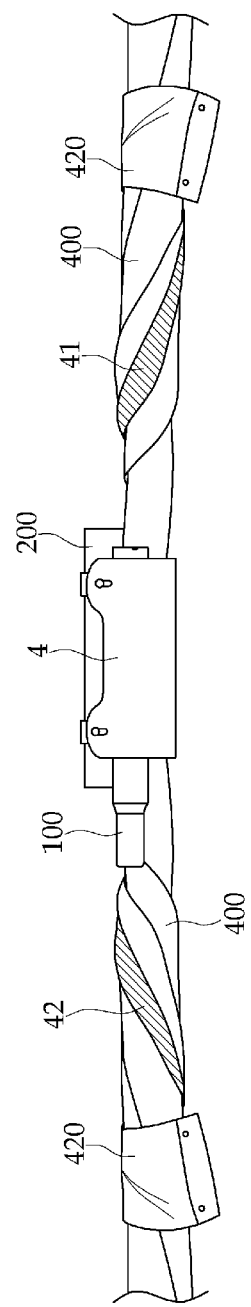
FIG. 8 is a view showing the exposure of the twist of the curtain airbag by the anti-twist device for the curtain airbag of the vehicle according to the second embodiment of the present invention.

FIG. 6 is a front view showing an anti-twist device for a CAB of a vehicle according to a second embodiment of the present invention. FIG. 7 is a view showing the mounting state of the anti-twist device for the CAB of the vehicle according to the second embodiment of the present invention. FIG. 8 is a view showing the exposure of the twist of the CAB by the anti-twist device for the CAB of the vehicle according to the second embodiment of the present invention.

As shown in FIG. 6 and FIG. 8, an anti-twist device A2 of the CAB for the vehicle according to the second embodiment of the present invention includes a winding part 4 having a predetermined area and wound around the outer surface of the inflator 100 and the bracket 200, and first and second strip members 41 and 42 protruding with a predetermined length from both end portions of the winding part 4.

The winding part 4 and the first and second strip members 41 and 42 preferably have a color different from that of the airbag cushion 400.

A marked line may be formed on the first and second strip members 41 and 42 in a longitudinal direction.

Meanwhile, as shown in FIG. 7, the first and second strip members 41 and 42 are provided in parallel to an outer portion of the airbag cushion 400.

After winding the winding part 4 around the outer surface of the inflator 100 and the bracket 200, an end portion of the winding part 4 is partially sewed with respect to the airbag cushion 400 or fixed onto the airbag cushion 400 by using a clip.

Then, after rolling the airbag cushion 400 in the form a round rod so that the volume of the airbag cushion 400 can be minimized, the band 420 is wound around the airbag cushion 400 that has been rolled and tied.

End portions of the first and second strip members 41 and 42 are fixed to the outer portion of the airbag cushion 400 and the band 420.

Accordingly, when the airbag cushion 400 is twisted, since the first and second strip members 41 and 42 are twisted with the airbag cushion 400 as shown in FIG. 8, the failure of the airbag cushion 400 can be recognized.

Although the exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. An anti-twist device for an airbag of a vehicle to prevent twist of an airbag cushion received in the airbag in a form of a roll when mounting the airbag to the vehicle, the airbag including a mounting bracket having an inflator mounted thereon, the mounting bracket for coupling to a vehicle body, the airbag cushion received in a winding state while communicating with the inflator, and a band surrounding the airbag cushion, the anti-twist device comprising:

a winding part which has a predetermined area and is wound around outer surfaces of the inflator and the bracket; and first and second strip members extending in opposite directions from the winding part.

2. The anti-twist device of claim 1, wherein the winding part and the first and second strip members have a color different from a color of the airbag cushion.

3. The anti-twist device of claim 1, wherein the first and second strip members are normally parallel to an outer portion of the airbag cushion.

4. The anti-twist device of claim 1, wherein the first and second strip members are secured to the airbag cushion.

5. The anti-twist device of claim 1, wherein the first and second strip members helically wrap around the airbag cushion to indicate that the airbag cushion is twisted.

6. The anti-twist device of claim 1, wherein the airbag cushion is a curtain airbag cushion.

7. An airbag arrangement for a motor vehicle comprising:

a bracket having an inflator mounted thereof, the mounting bracket for coupling to a vehicle body of the motor vehicle;

an airbag cushion normally stored in a winded state while communicating with the inflator;

a band surrounding the airbag cushion; and an anti-twist device to prevent twist of the airbag cushion, received in the airbag in a form of a roll when mounting the airbag to the anti-twist device including a winding part which has a predetermined area and is wound around outer surfaces of the inflator and the bracket, the anti-twist device further including first and second strip members extending in a opposite directions from the winding part, a central portion of the anti-twist device fixed relative to the inflator;

wherein the central portion and the first and second strip members normally lie in a common plane and further wherein the first and second strip members helically wrap around the airbag cushion to indicate that the airbag cushion is twisted.

8. The airbag arrangement of claim 7, wherein the anti-twist device is normally maintained in a flat orientation.

9. The airbag arrangement of claim 7, wherein the airbag cushion is a curtain airbag cushion.

10. The airbag arrangement of claim 7, wherein the first and second strip members are normally parallel to an outer portion of the airbag cushion.

11. The airbag arrangement of claim 7, wherein the first and second strip members are secured to the airbag cushion.

* * * * *